United States Patent [19]

Poot, Jr.

[11] Patent Number: 5,065,294
[45] Date of Patent: Nov. 12, 1991

[54] FITTING FOR HORTICULTURAL LIGHTING

[75] Inventor: Jacob Poot, Jr., Schiedam, Netherlands

[73] Assignee: Poot Lichtenergie B.V., Schipluiden, Netherlands

[21] Appl. No.: 296,793

[22] Filed: Jan. 13, 1989

[30] Foreign Application Priority Data

Jan. 22, 1988 [NL] Netherlands .................. 88.00149

[51] Int. Cl.$^5$ .............................................. F21V 7/00
[52] U.S. Cl. .................................. 362/346; 362/294; 362/373; 362/322; 362/306; 362/805
[58] Field of Search .............. 362/805, 437, 457, 341, 362/373, 374, 375, 362, 297, 298, 277, 319, 322, 447, 457, 458, 145, 147, 217, 218, 306, 294, 345; 47/DIG. 6

[56] References Cited

U.S. PATENT DOCUMENTS

| | | | |
|---|---|---|---|
| 3,009,053 | 11/1961 | Shaw et al. | 362/29 X |
| 3,679,892 | 7/1972 | Shearer | 362/346 |
| 3,784,808 | 11/1974 | Mori | 362/294 |
| 3,803,401 | 4/1974 | Drews | 362/218 |
| 3,860,829 | 1/1975 | Fabbri | 362/218 |
| 4,455,594 | 6/1984 | Yang | 362/277 |
| 4,562,517 | 12/1985 | Pankin | 362/217 |
| 4,674,016 | 6/1987 | Gallagher | 362/217 |
| 4,731,711 | 3/1988 | Engel | 439/226 |
| 4,734,830 | 3/1988 | Christian et al. | 362/805 |
| 4,758,935 | 6/1988 | Frassati et al. | 362/147 |

Primary Examiner—Ira S. Lazarus
Assistant Examiner—D. M. Cox
Attorney, Agent, or Firm—Watson, Cole, Grindle & Watson

[57] ABSTRACT

A fitting for horticultural illumination includes a reflector and a housing for auxiliary equipment, the reflector being attached to the housing by a universal coupling so that the reflector can be exchanged for a reflector with other properties, thereby reducing investments when crops are changed. According to a preferred embodiment the reflector includes a collar adapting it for coupling with the housing. Both the collar including the reflector and the housing are suspended by a profile, thus forming a pre-assembled unit which is suspended by hooks from a rail provided in the greenhouse to be illuminated.

11 Claims, 6 Drawing Sheets

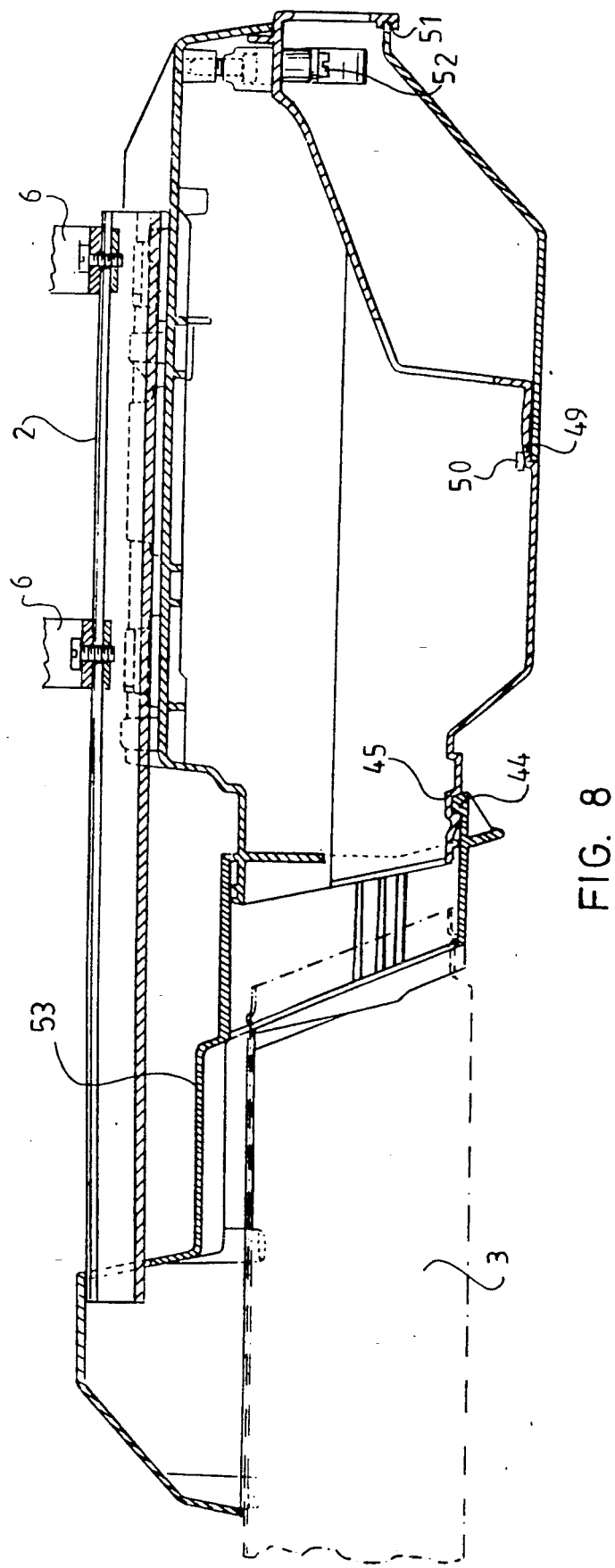

FITTING FOR HORTICULTURAL LIGHTING

The present invention relates to a fitting for horticultural lighting, comprising a housing for connecting equipment, a lamp holder provided in the housing and a reflector, wherein a lamp to be fitted in the lamp holder extends into the area of the reflector.

Such fittings are generally known.

In such fittings the housing for the connecting equipment and the reflector have such shapes that a certain housing for connecting equipment is fit for only one single reflector; the reflector and the housing are an inseparable unit. In horticulture it often happens that the crop produced in an illuminated area has to be changed, so that the distance between the fittings and the crops has to be changed and that the reflector has to be adapted. Of course, it is a very costly matter to replace all fittings as a whole.

The present invention aims to provide such a fitting, wherein the reflector can be exchanged for a reflector with another configuration.

This aim is reached in that connecting means between the housing and the reflector are such that the reflector can be replaced by a reflector with another configuration.

Consequently, in an illumination installation the reflectors can be replaced by reflectors with another configuration, so that the lighting properties of the fitting can be adapted to changing circumstances without involving large investments.

Also these measures will substantially simplify the stock keeping of such fittings, as only one type of housing is fit for all kinds of reflectors.

The present invention will be further elucidated with the help of the accompanying drawings.

BRIEF DESCRIPTION OF THE DRAWINGS

FIG. 8 is a cross-sectional view of the embodiment shown in FIG. 7 according the line VIII—VIII.

DETAILED DESCRIPTION OF THE PREFERRED EMBODIMENTS

Figure 1:
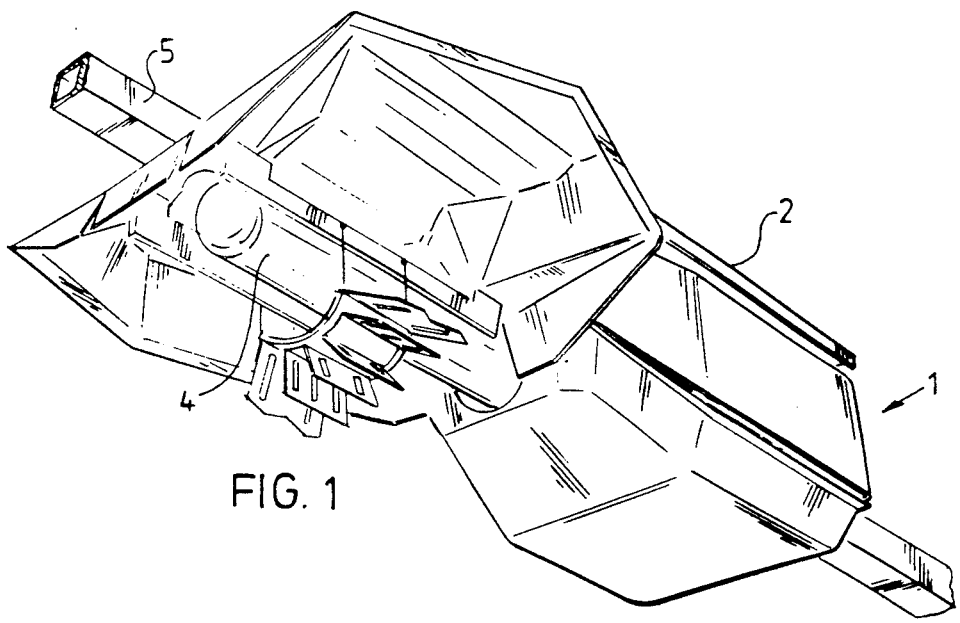
FIG. 1 is a perspective view from underneath of a fitting according to the present invention.

The fitting depicted in FIG. 1 comprises a housing 1 for connecting equipment which is supported by a profile 2 extending above. The profile 2 supports a reflector 3. A lamp holder, not depicted in the drawing, is provided in the housing 1, and a lamp 4 is located in the lamp holder such that the lamp extends in the area of the reflector. By means of hooks, not depicted in FIG. 1, the profile 2 and thus the whole fitting is supported by a supporting rail 5 extending within the greenhouse to be luminated.

Figure 2:
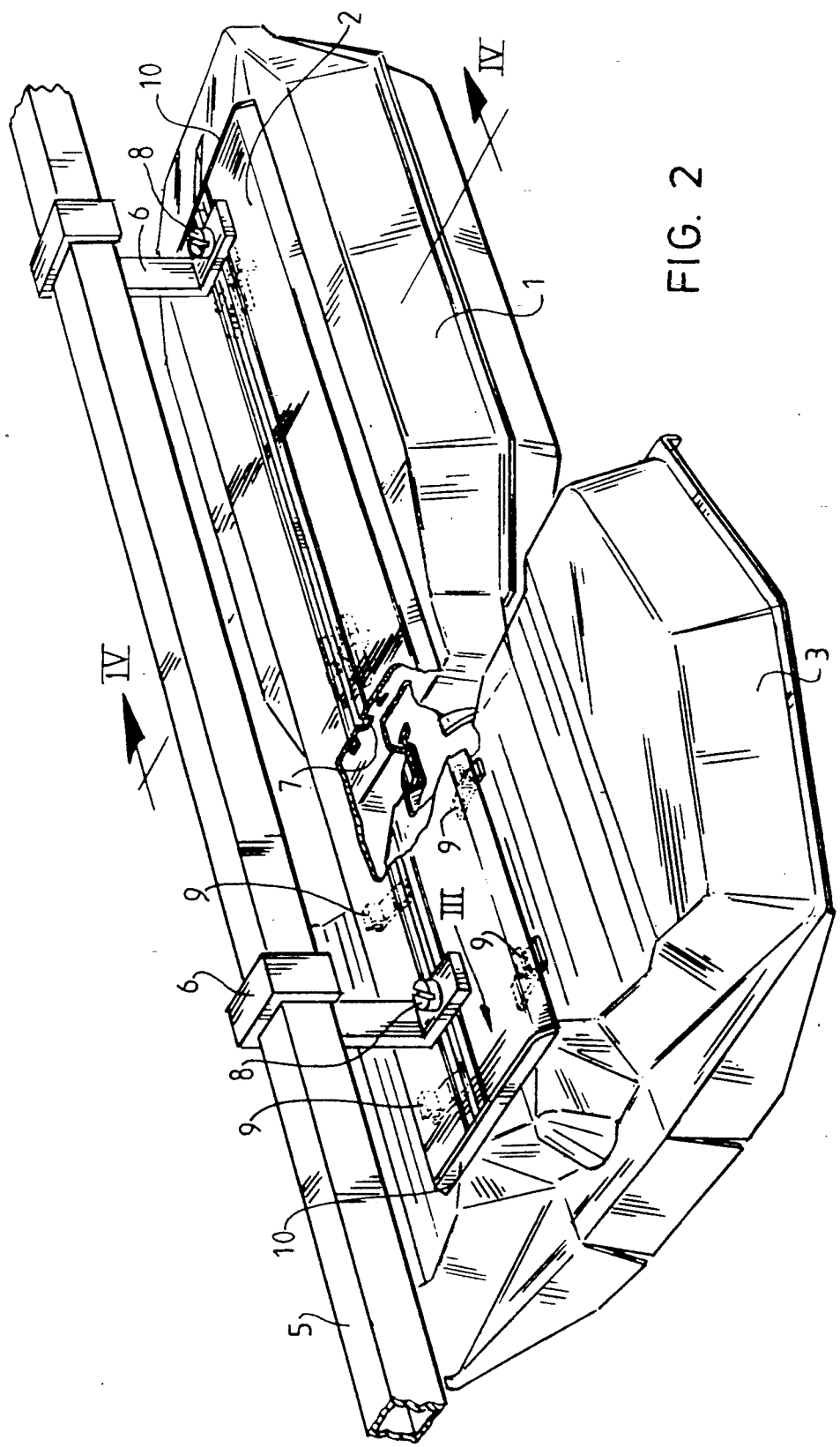
FIG. 2 is a perspective view, partly broken away, of the fitting depicted in FIG. 1, but from above.

In the top view shown in FIG. 2 it is depicted how the profile 2 is supported by the supporting rail 5 by means of hooks 6. Therefore the profile 2 comprises a partly covered slot, wherein a square nut, not depicted in the drawings, is located at the location of each supporting hook 6. A bolt 8 is inserted in an aperture provided in each of the hooks 6 and the bolt 8 is screwed in the associated nut, so that the supporting hook 6 is fixed to the profile 2. This means of fixing allows the shifting of the hooks 6 in the longitudinal direction of the supporting rail 5, so that possible obstructions at the supporting rail can be avoided.

The reflector 3 comprises four hooks 9 which are screwed against reflector 3. These hooks 9 engage a rim provided in the profile 2, providing an attachment of the reflector 3 to the profile. The hooks 9 can, however, also be attached to the reflector 3 by means of adhesive or by means of rivets. The profile 2 is terminated at both sides by terminal pieces 10.

Figure 3:
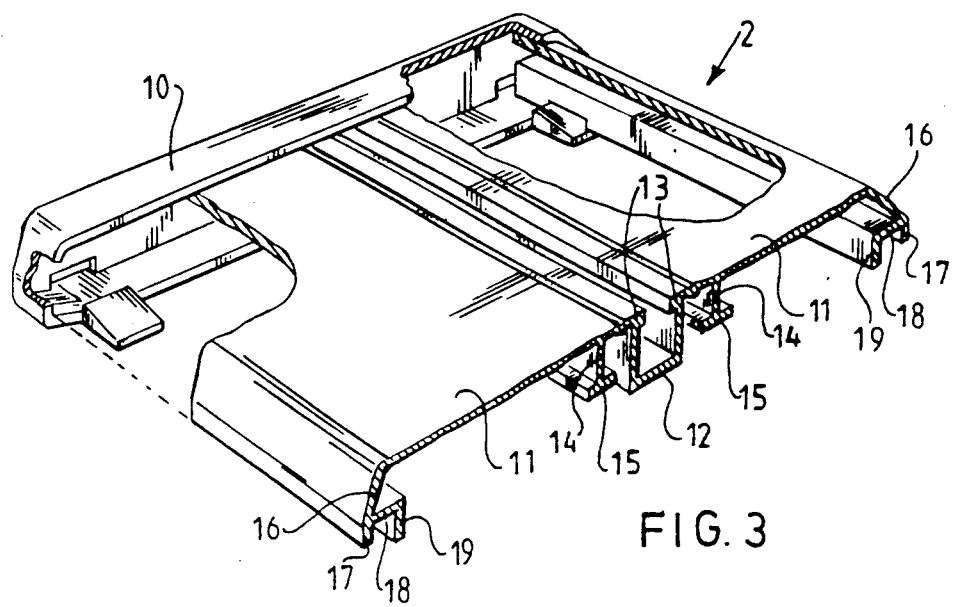
FIG. 3 is a perspective view, partly broken away, of a piece of profile to be used with the fitting according to the present invention.

FIG. 3 shows a portion of the monolithic profile more in detail. The profile comprises flat plates 11 of equal size which are separated by a gutter 12. The plates 11 have such dimensions that they both extend over a part of the gutter 12, so that the gutter 12 comprises two rims 13 at its upper side. At both sides of the gutter a vertical strip 14 is provided which is terminated at its lower end by a rim 15.

The plates 11 are terminated by a bevelled piece 16, which ends in a vertical strip 14 of the connection line. Between the bevelled wall 16 and the rim 17 a rim 18 extends outwardly. At its inner side the rim 18 is terminated by a strip 19 extending downwardly.

Thus rims 15, 18 are developed for engaging the reflector hooks 9. As will appear in the following, these rims 15, 18 are also used for the attachment of the housing 1 for switch gear. The rims 13 within the gutter 12 are used for the attachment of suspension hooks 6 as has been described with the help of FIG. 2. Instead of the profile shown it is of course possible to use other profiles and to stay within the scope of the present invention.

Figure 4:
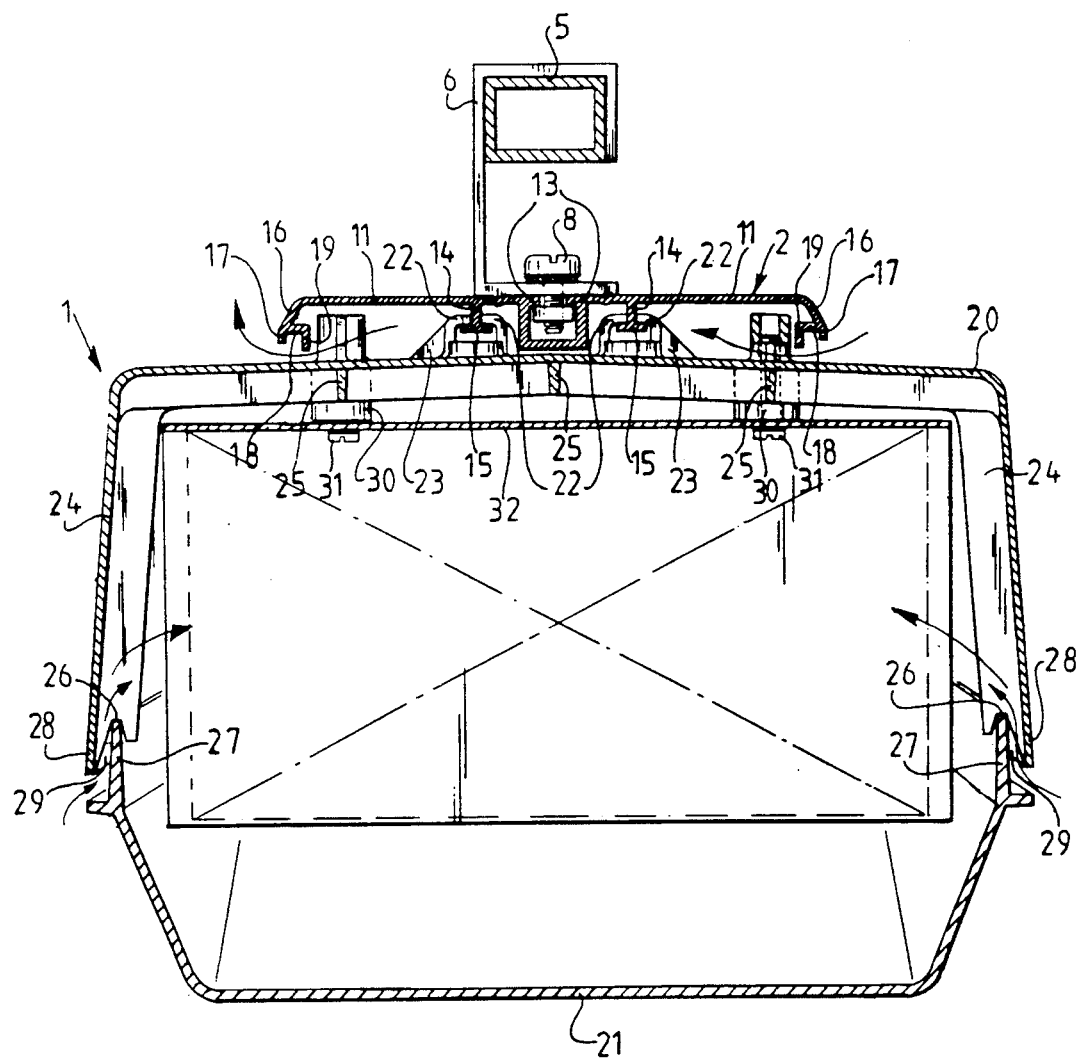
FIG. 4 is a cross-sectional view according to the line IV—IV in FIG. 2.

In FIG. 4 it is clearly visible that the housing 1 for connecting equipment comprises an upper plate 20 and a lower plate 21. The upper plate 20 comprises hooks 22 for attaching the upper plate to the rims 15 of the profile 2. Both hooks 22 comprise a reinforcement rim 23.

The upper plate comprises at several cross-sections an internal reinforcement rim 24 extending perpendicular to the longitudinal direction and also several inner reinforcement rims 25 stretching in the longitudinal direction and provided at the upper side.

The transverse rims 24 comprise notches 26 at both lower ends, in which the upper rim of the lower plate is positioned. These notches are in some distance from the outer rim of the upper plate 24, so that between the upper rim 27 of the lower plate and between the lower rim 28 of the upper plate an airing channel 29 is provided at both sides of the housing over the full length thereof.

At the intersections of the rims 24 and 25 a number of bushings 30, which extend through the upper wall of the upper plate 20. These bushings comprise a central aperture, through which a mounting plate 32 can be provided against the upper wall of the upper plate 20 by means of parker screws 31, and such that some space remains therebetween.

Figure 5:
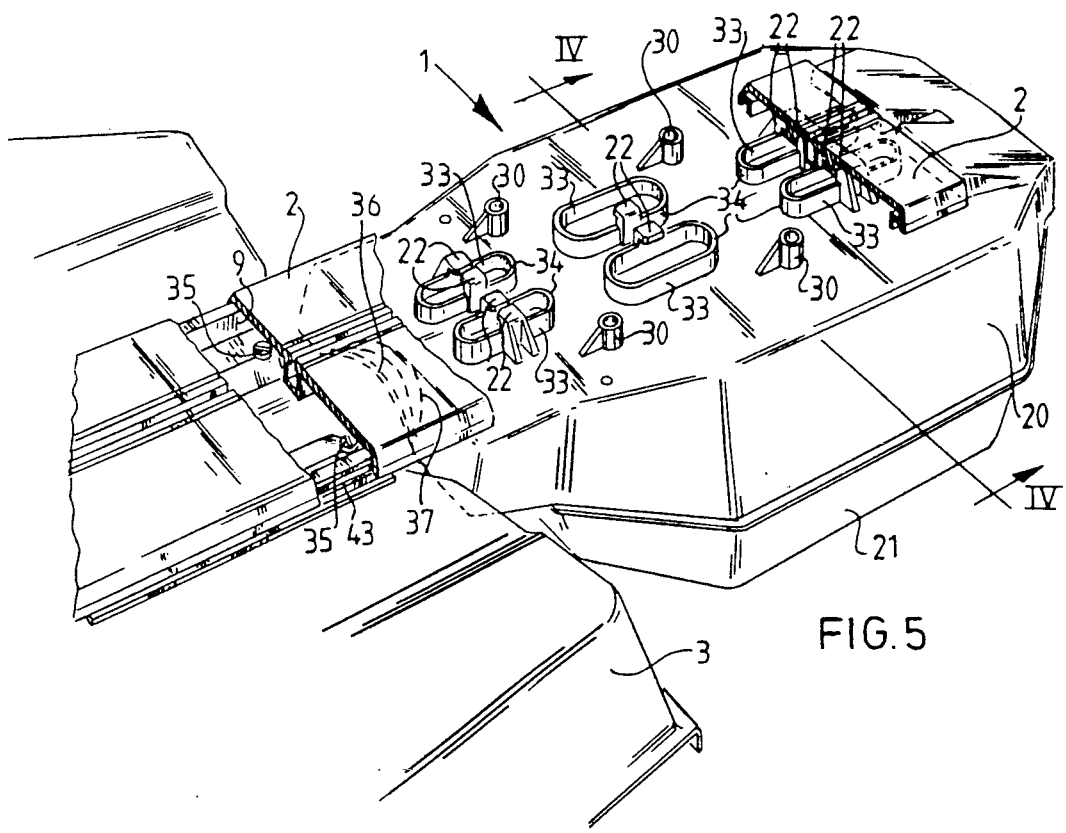
FIG. 5 is a perspective view of a housing for connecting equipment, wherein the profile present above is partly broken away.

From the perspective view of the housing 1 for connecting equipment as is shown in FIG. 5, it appears that the upper plate 20 comprises a number of apertures 33. Each of these apertures is surrounded by an upstanding rim 34 extending around it. Besides, the apertures 33 are provided such that they are completely covered at their upper sides by the profile 2. A number of hooks 22 are monolithic with one of the upper rims 34.

In FIG. 5 it is also visible how the reflector 3 has been attached to the profile 2 by means of reflector attachment profiles 43. In the embodiment shown these profiles 43 have been attached to the reflector by means of screws 35. This figure also shows that the neck 36 of the reflector 3 comprises a rim 37 to prevent water dripping from the reflector 3 from entering the housing 1.

Figure 6:
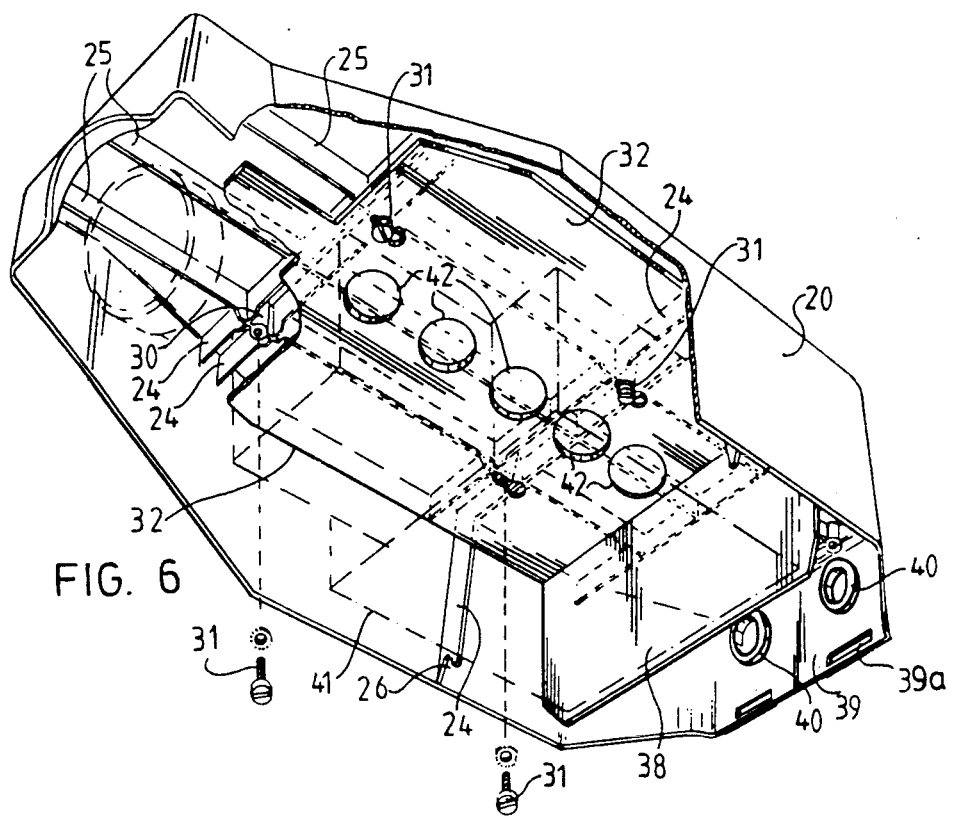
FIG. 6 is a perspective view from underneath of the upper plate of the housing for connecting equipment with the mounting plate being present therein.

FIG. 6 shows the inner side of the upper plate 20 of the housing 1 for connecting equipment. This figure shows how the mounting plate 32 comprises a folded part 38, at the back side whereof connecting means can be mounted for the connection of the power supply. Therefore swivels 40 have been provided in the head wall 39 of the upper plate. The auxiliary apparatuses, like a transformer, a starter, capacitors and the lamp holder are mounted on the mounting plate 32, and such that at least the heat producing components are on a substantial distance from both plates 20, 21 of the housing 1. This avoids that by radiation heat the plates melt or are disturbed. Further the mounting plate 32 comprises a number of apertures 42 to maintain a good circulation of air within the housing.

Herewith the remark is made that through the slit between both plates a good supply of air is secured, while, as a consequence of the holes in the mounting plate, a good circulation of air can take place within the housing and the air heated by the dissipation of the components can be released through the apertures 33 in the upper plate. This circulation of air is necessary as the housing has been made of plastic and through the heat of the dissipation of the components within the housing could melt or could burn. By securing a good circulation of air this danger is avoided.

By producing the housing of plastic, this is insulated according to class 2. As a consequence thereof the ground connection can be deleted.

As such fittings are often mounted in greenhouses the danger exists that with a random positioning of the apertures large amounts of water may enter the housing, which is of course undesired. Therefore the apertures have been provided such that the housing is at least sealed against dripping water according to the standard IP23. Thus the entering of a extravagant amount of water into the housing is avoided.

To simplify the mounting of such fittings these have to be joined beforehand, so that they can be mounted to the present suspension rail 5 with little handling. Then the lower plates 21 are removed, the cables are entered by means of the swivels 40, after which the cables are stripped and connected, after which the lower plates 21 can be positioned again. Herein it is of importance that the lower plates 21 can be released and mounted with little labour. Therefore the head wall 39 comprises two eyes 39a, in which hooks, not depicted in the drawing and connected with the lower plate 21 can engage. The reflector side of the lower plate can easily be mounted to the upper plate by means of a snap or screw connection.

Figure 7:
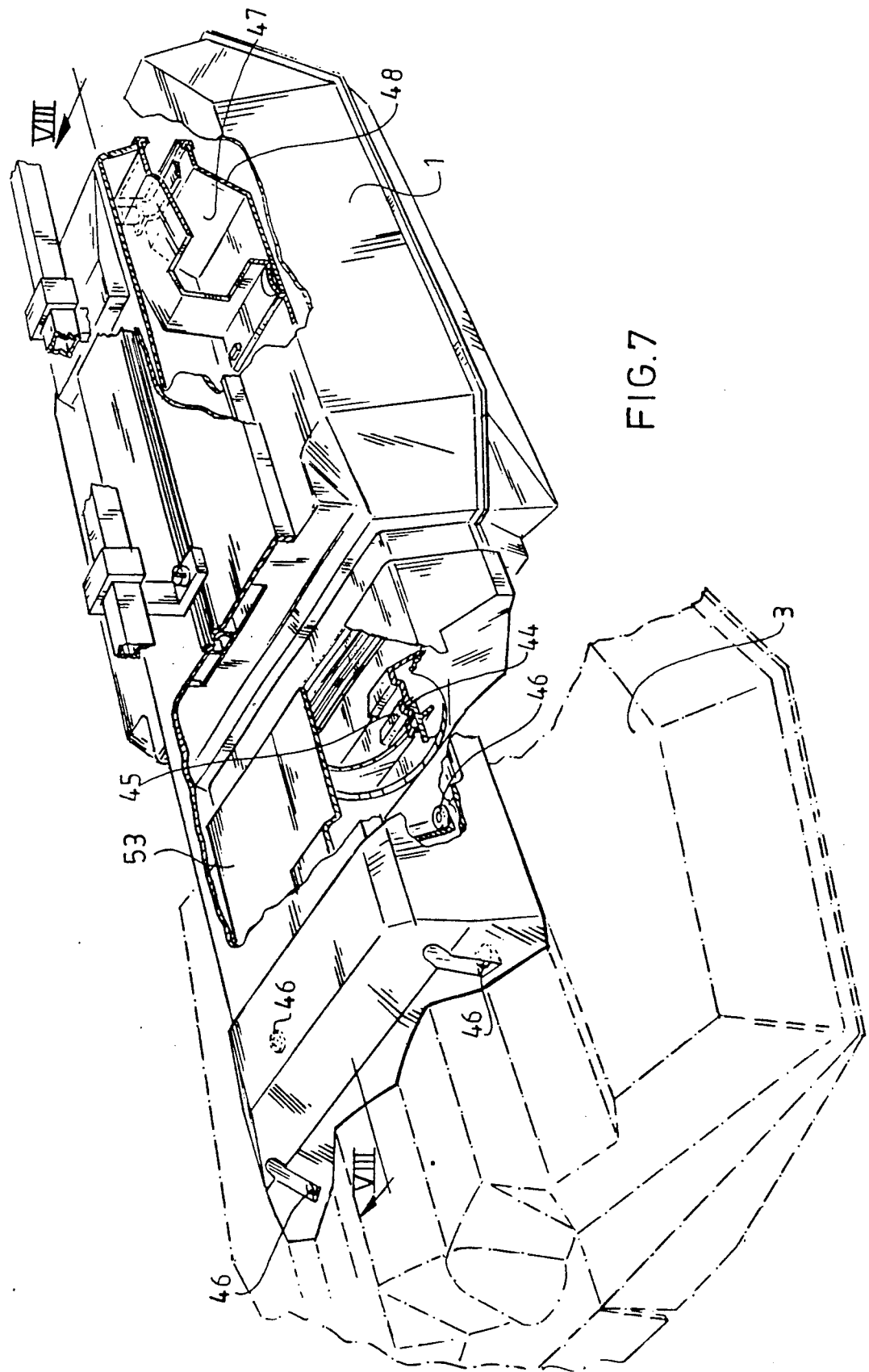
FIG. 7 is a perspective view of a second embodiment of the fitting according to the present invention.

The embodiment shown in FIG. 7 deviates initially from the embodiment shown beforehand in that the housing, in which the connecting apparatus have been provided, is much smaller. This relates to requirements for such housings; in several countries the choke belonging normally to connecting apparatus can be deleted — relating to the requirements in vigour — so that no space has to be reserved therefore in the housing 1. Whereas these chokes are rather bulky elements, the elimination thereof can substantially reduce the size of the housing one and the mounting plate provided therein.

The effect of a smaller housing resides not only in savings in material and the advantages related thereto but also in the fact that the housing is hit by less light and thus causes less shadow with normal sun light. This has a considerable consequence on the amount of light hitting the plants underneath.

Further, this embodiment deviates by the provision of an adapter or collar 53 as a connection between the housing 1 and the reflector 3. By using the collar 53 it becomes easy to use the housing 1 with several shapes of reflectors. For every other reflector 3 only the shape of the adapter 53 has to be adapted.

The adapter 53 comprises rims 44, fitting into slots 45 provided in the housing 1, so that a snap connection is developed and the adapter 53 is connected firmly with the housing 1. By providing several parallel groups the adapter can be mounted in several positions in the housing 1, so that it is fit for lamps with different lengths. Further, the reflector 3 is not any more connected to the suspension rail 2 as is the case in preceding embodiment, but is mounted to the adapter 53 by means of rivets 46. The profile 2 extends through into the adapter 53, so that the adapter is suspended from the profile 2.

The consequences thereof are that the mounting of the fittings is simplified considerably; beforehand the collars have already been riveted to the relevant reflectors, so that during mounting after the mounting of the housing 1 only the combination of the adapter 53 and the reflector 3 against the housing has to be provided by means of a simple snap connection.

Further, the housing 1 of this embodiment comprises a compartment 47 in which connection means have been provided for the connection of the fitting with a supply cable. The compartment can be locked by means of a lid 48, which is hooked at one side by means of two hooks 50, in apertures 49 in the wall 1 of the housing, while the other side of the lid is mounted by means of a snap connection 51. For release of pulling power of the cables a screw 52 has been provided. This simplifies the connection of the fitting according to this embodiment considerably.

Thus a fitting is provided which can be used in several situations, and can be manufactured at low cost and of which the mounting costs are low.

What is claimed is:

1. A horticultural lighting fixture comprising, in combination, a housing unit for electrical connecting means and a lamp mounted in the housing unit and having a free end portion projecting from one end of the housing unit, a first reflector unit separate from the housing unit and spaced therefrom to overlie said free end portion of said lamp, and connecting means for detachably joining the housing unit and the first reflector unit in horizontally suspended, end-to-end relation.

2. A horticultural lighting fixture as defined in claim 1 wherein said connecting means comprises a profile detachably connected to said housing unit and overlying the housing unit and hook means detachably connecting the profile to the reflector unit.

3. A horticultural lighting fixture as defined in claim 2 including second hook means for suspending the profile from an overhead rail.

4. A horticultural lighting fixture as defined in claim 1 wherein said connecting means comprises a profile detachably connected to said housing unit and means detachably connecting the reflector unit to said one end of the housing unit.

5. A horticultural lighting fixture as defined in claim 1, including a second reflector unit which is cooperable with said connecting means to be detachably joined to the housing unit alternatively to said first reflector unit, said first and second reflector units having different configurations.

6. A fixture for horticultural lighting which comprises a profile, a housing for connecting equipment which includes monolithic hooks for supporting said housing below said profile, a lamp holder in said housing, a reflector having a first configuration and located adjacent said housing such that a lamp fitted in said lamp holder extends in the area of the reflector, first hook means for supporting the reflector below said profile, and second hook means which are movable in a longitudinal direction of the profile for supporting the profile below a supporting rail, said first hook means enabling said reflector to be replaced with a reflector having a second configuration which is different from said first configuration.

7. A fixture for horticultural lighting which comprises a housing for connecting equipment, said housing having an upper wall; a lamp holder in said housing; a mounting plate which extends substantially in parallel with a portion of said upper wall and which supports said connecting equipment and said lamp holder; a reflector having a first configuration and located adjacent said housing such that a lamp fitted in said lamp holder extends into the area of the reflector, and connecting means for detachably joining the housing and the reflector and enabling said reflector to be replaced by a reflector having a second configuration which is different from said first configuration.

8. A fixture for horticultural lighting which comprises a housing for connecting equipment, said housing including an upper plate having a swivel through which cables can pass and power supply connections, a lamp holder in the housing, a reflector having a first configuration and located adjacent said housing such that a lamp fitted in said lamp holder extends into the area of the reflector, and connecting means for detachably joining the housing and the reflector and enabling said reflector to be replaced by a reflector having a second configuration which is different from said first configurations.

9. A fixture for horticultural lighting which comprises a housing for connecting equipment, said housing including an upper plate and a lower plate, said upper and lower plates being connected on one side by pivotable gripping means in the form of notches in the upper plate and cooperating cams on the lower plate and on an opposite side by locking means, said upper and lower plates providing a ventilation slit therebetween and said upper plate including ventilation apertures that are each surrounded by upwardly-extending rims to prevent entry of water; a profile which extends above at least the ventilation apertures in the upper plate of the housing; a lamp holder in said housing; a reflector having a first configuration located adjacent the housing such that a lamp fitted in said lamp holder projects outwardly of the housing and into the area of the reflector; and connecting means for detachably joining the housing and the reflector and enabling the reflector to be replaced by a reflector having a second configuration which is different from the first configuration.

10. A fixture according to claim 9, wherein the ventilation slit is protected against the entering of dripping water.

11. A fixture for horticultural lighting which comprises a housing for connecting equipment, a lamp holder in said housing for mounting a lamp such that it projects outwardly of said housing, a reflector having a first configuration and located adjacent said housing such that a lamp mounted in said lamp holder will extend into the area of the reflector, and a coupling element which supports said reflector and which is snap connectable to said housing in several positions to accommodate lamps of differing lengths, said coupling element enabling said reflector to be replaced with a reflector having a second configuration which is different from said first configuration.

* * * * *